(12) United States Patent
Belisle

(10) Patent No.: US 9,300,230 B2
(45) Date of Patent: Mar. 29, 2016

(54) APPARATUS FOR ELEVATING AND MANIPULATING OBJECTS

(71) Applicant: William Redvers Belisle, New Orleans, LA (US)

(72) Inventor: William Redvers Belisle, New Orleans, LA (US)

( * ) Notice: Subject to any disclaimer, the term of this patent is extended or adjusted under 35 U.S.C. 154(b) by 0 days.

(21) Appl. No.: 14/676,954

(22) Filed: Apr. 2, 2015

(65) Prior Publication Data

US 2015/0206640 A1    Jul. 23, 2015

Related U.S. Application Data

(62) Division of application No. 13/299,918, filed on Nov. 18, 2011, now Pat. No. 9,061,761.

(51) Int. Cl.
*H02N 15/00* (2006.01)
*H01F 7/02* (2006.01)

(52) U.S. Cl.
CPC ............. *H02N 15/00* (2013.01); *H01F 7/0236* (2013.01)

(58) Field of Classification Search
CPC ......... H02N 15/00; H02K 7/09; H01F 7/0236
USPC ........................................................ 310/90.5
See application file for complete search history.

(56) References Cited

U.S. PATENT DOCUMENTS

2003/0027483 A1\* 2/2003 Rosenberg ............. A63H 23/10
446/129

\* cited by examiner

*Primary Examiner* — Ramon M Barrera

(57) ABSTRACT

An enclosure to enclose the vertical electromagnetic repulsive elevation and manipulation of electromagnets is presented. The enclosure is capable of elevating the electromagnet to various heights and additionally horizontally repelling the elevated electromagnet from one elevated position to the next. The heights of the elevated electromagnet may vary depending on the voltage of the base electromagnets, the polarities of the electromagnets and the desired height of the elevated electromagnet.

5 Claims, 2 Drawing Sheets

APPARATUS FOR ELEVATING AND MANIPULATING OBJECTS

CROSS-REFERENCE TO RELATED APPLICATIONS

This application is a divisional application of U.S. non-provisional Ser. No. 13/299,918 and as such, application Ser. No. 13/299,918 is hereby incorporated by reference.

STATEMENT REGARDING FEDERALLY SPONSORED RESEARCH AND DEVELOPMENT

Not Applicable

REFERENCE TO A "MICROFICHE APPENDIX"

Not applicable

BACKGROUND OF INVENTION

1. Field of the Invention/Technical Field

The present invention is in the technical field of Electricity: Electrical Systems And Devices. More particularly, the present invention is in the technical field of control circuits for electromagnetic devices.

2. Description of Related Art/Background Art

Present patents describe the use of gravity, magnetic, electrical, electromagnetic, or other artificial fields to remove voids in via (heated vias) holes in integrated circuits using magnetic repulsion (Linliu and Kung, 1999), to attract magnetic objects (Wing, 1996), and to maintain or connect satellite orbits about the moon with the assistance of the moon's gravitational pull (i.e. after the satellite has been placed in orbit . . . ) (Dulek, 1996). Patents for magnetic fields describe the use of such fields to move electrodes within closed vessels or tubes filled with a physiologic saline (Takeda, et al., 1999), to stably suspend in a non-contacting manner, by the combination of high temperature superconductor and a ferromagnetic member (Higuchi, et al., 1999), to at least compensate for the earth's magnetic field in at least two fields and an excitable coil to compensate for the component of the earth's magnetic field in the third direction (De Wit, et al., 1999), and to deflect charged species produced by a laser beam (Radhakrishnan, Gouri, 1999). McDaniel, et al. (1980) describe the use of magnetic fields to repel or attract permanent magnets in specially configured, non magnetic material as a part of a game used for entertainment purposes. Patents for magnetic fields also describe the use of magnetic fields to detect magnetic field mines (Bomhofft and Irenkler, 1986).

As referenced in the priority application Ser. No. 11/827,433, patents for electrical fields describe the use of electrical fields to align and rotate electrically and optically anisotropic spheroidal balls in a substrate (Sheridon, 1998). Criswell (1993) describes the use of lasers or electromagnetic fields to energize the propellant trail of a rocket for combustion. Kare (1992) describes the use of a focused (using focusing mirrors) laser or electromagnetic energy to break down air or other fluids creating plasma. The plasma, which has absorbed energy from the laser, grows in volume and provides thrust.

Coffey (1993) does not claim or include the elevation and sustaining the elevation of an object at a single x, y, z coordinate or position as does the present invention. Also, Coffey claims a repelling device and a repelled vehicle parallel to each other to generate a repulsive force between the guideway and the magnetic devices. In the present invention, the repelled object is positioned above the repelling object surface. In the present invention, the repelled object is position vertically at an approximate ninety degree angle relative to the surface of the repelling surface.

Also, Coffey claims a plurality of propulsion windings affixed to a support structure connected to a power source and used to generate a vehicle repulsive force to propel a vehicle along a roadbed support structure. The present invention does not claim a plurality of propulsion windings affixed to a support structure connected to a power source and used to generate a vehicle repulsive force to propel a vehicle along a roadbed support structure. The phrase " . . . to propel a vehicle along a road support structure . . . " suggests a horizontal type movement of the vehicle. The propelling, repelling motion of the repelled object in the present invention is vertical.

Similarly, Coffey describes a vehicle that may be advanced over a guideway by propeller, jet, rocket, or other suitable propulsion means. In the present invention, the object is vertically transported as opposed to horizontal transport as described by Coffey. The present invention does not describe the use of a propeller, jet, rocket, or other suitable propulsion means.

Furthermore, Coffey describes a vehicle positioned between the repulsion generating source and the repelling source. In the present invention, the elevated object is not positioned between the repulsion generating source and the repelling source. In the present invention, the object is positioned above the repelling source.

Finally, Coffey describes the magnet 16 as being "confined" within the guideway structure by LSM 20. Such confinement restricts the vertical movement of the vehicle described by Coffey. In the present invention, there is no confinement that restricts the vertical movement of the elevated object.

The first statement in the Lovell patent is "This invention relates to an electromagnet for attracting non-magnetic conducting bodies as well as magnetic bodies". Lovell also states in the first section of the patent "A further object resides in the fixing one closed conductor firmly to a structure of the field producing means to provide an electromagnet which will attract and hold a closed conductor even though it is non-magnetic and at some distance from the field producing means". The present invention does not claim or describe a magnetic or electromagnetic attractive means for transporting, elevating, or moving objects. Lovell disclosed that electromagnets are well known to be used to be manipulated by magnetic and electromagnetic attraction. The present invention discloses electromagnets used to manipulate, and be manipulated by electromagnetic repulsion only. Lovell claims "an electromagnet, a closed conductor, an armature of non-magnetic conducting material adjacent thereto, . . . the armature being of such size and shape and so positioned as to be attracted to the closed conductor by electromagnetic flux forces". The present invention claims a means to elevate and manipulate objects using repulsive electromagnetic forces. Lovell claims " . . . said armature being so dimensioned with respect to the resultant field as to be held to the magnet by attracting electromagnet forces". Lovell claims " . . . an armature of non-magnetic conducting material adhering to said secondary by attracting electromagnetic forces arising from current circulated within the armature by induction". Lovell claims " . . . an armature of non-magnetic conducting material disposed in the resultant field, said armature being so dimensioned and so positioned in the resultant field that the armature is attracted axially toward the electromagnet". The present invention does not claim an armature of non-magnetic conducting material. The present does not claim any degree of attractive forces for the elevation and manipulation of electromagnetic objects. Lovell claims "An alternating current electromagnet comprising inducing means, attracting means fixed in position relative to the inducing means, and a member of non-magnetic conducting material held to the attracting means by axially attracting and laterally centering forces caused by interaction of fluxes of alternating currents flowing in the attracting means and of currents circulated with said member by induction. The present invention does not claim any component or object being held to an attracting means. Throughout the description, Lovell refers to the 'attractor' and to the 'attracted mass' as components of the invention. The present invention does not claim or describe an 'attractor' or an 'attracted mass' as components of the invention.

Baker et al. describe "The permanent type magnet having windings is disposed adjacent to a balance beam which is movable in response to changes in the strength of the permanent magnetic having windings. The present invention does not describe a permanent type magnet having windings that is disposed adjacent to a balance beam which is movable in response to changes in the strength of the permanent magnetic having windings. The present invention describes an electromagnet positioned to elevate and manipulate an object. The experiment described in the present invention includes a rectangular shaped enclosure used to reduce elevated object flipping and keeps the elevated object above the elevating electromagnet. Baker et al. describe "a principal object of this invention is to provide an improved method and apparatus for activating process control or other elements". The present invention does not describe a method and apparatus for activating process control or other elements. Baker et al. describe "FIG. 1 shows, in diagrammatical form, an assembly which converts a magnetic force to pneumatic output . . . ". The present invention does not describe an assembly which converts a magnetic force to pneumatic output.

Metz, et al., claim "A lifting electromagnet, comprising a plurality of cores defining poles arranged to attract and support at least predominantly ferromagnetic objects . . . ". The present invention claims an electromagnet positioned to elevate objects using electromagnetic repulsion. Metz et al. also claim a sensor, which is disposed between two poles, used to position the lifted and transported object. The present invention does not claim a sensor used to position the elevated object. Metz et al. describe a single or composite lifting electromagnet with several cores whose poles can attract round, elongated or otherwise configured ferromagnetic objects. The present invention describes a lifting electromagnet whose pole elevates objects through electromagnetic repulsion. Metz et al. describes sensors that generate signals that lead to the facilitation of automatic guidance of the electromagnet. The guidance of the elevated object in the present invention includes the light-weight ring attached to the bottom of the elevated object and the exterior width of the elevated object and its proximity to the inside walls of the rectangular shaped enclosure and the glass tube. Unlike the present invention, Metz et al. also describe the position to which the object is to be lifted and transported to as the treating station of a machine tool.

Dolgin claims "A system for levitation which depends upon the Meissner effect and for vibration damping of a cryogenic instrument inside a cold chamber . . . ". The present invention does not claim a system for levitation which depends upon the Meissner effect and for vibration damping of a cryogenic instrument inside a cold chamber. The present invention claims a system for elevating and manipulating objects which depends upon the repulsive forces between the lower positioned electromagnet and the elevated object. Dolgin describes " . . . a pick-up coil 14 which senses any motion of the flux source 13." Considering FIG. 1, the immediately preceding sentence indicates the vertical, especially vertical and upward motion of the flux source 13 towards the superconductor material position (with a 'stationary' pick-up coil 14) is therefore attracted in an upward motion towards the superconductor material 10. The present invention describes vertical repulsion of an object movement away from a base or lower located electromagnet.

The patents described above do not address the use a rectangular-shaped enclosure involving primarily vertical and horizontal electromagnetic fields only to directly elevate and manipulate objects (i.e. without converting laser or electromagnetic energy into fueled propulsive energy). To overcome these shortcomings, the present invention provides a mode of elevating and manipulating objects involving a dimension specific rectangular-shaped apparatus for dimension specific vertical electromagnetic object repulsion and a specific enclosure dimension-specific device for such a specific enclosure apparatus.

BRIEF SUMMARY OF INVENTION

Considering the elevation and manipulation of objects in general, the present invention is equipped with at least one field producing source or device, such as a field producing electromagnet, and at least one object, such as a smaller electromagnet of same or similar polarity, such that the smaller object is positioned (in a stable manner) directly above the large or strong field producing source or device. The field producing source or device contributes to the upward or vertical or other movement, elevation, and manipulation of the object. Further, the present invention consists of the elevated and manipulated object(s), the field producing device(s) or source(s), or other mechanisms that are made, drawn, or designed as to allow the object(s) to be manipulated or operated as desired. Specifically, it is the objective of the invention to provide a specific enclosure for electromagnetic repulsion of objects and provide a unique enclosure in which the electromagnetic elevation and manipulation to demonstrate a higher degree of object elevation and manipulation using electromagnetic fields compared to the aforementioned references. This invention may be used for such applications as a toy, transportation of small objects, or displays.

DETAILED DESCRIPTION OF THE INVENTION

Figure 1:
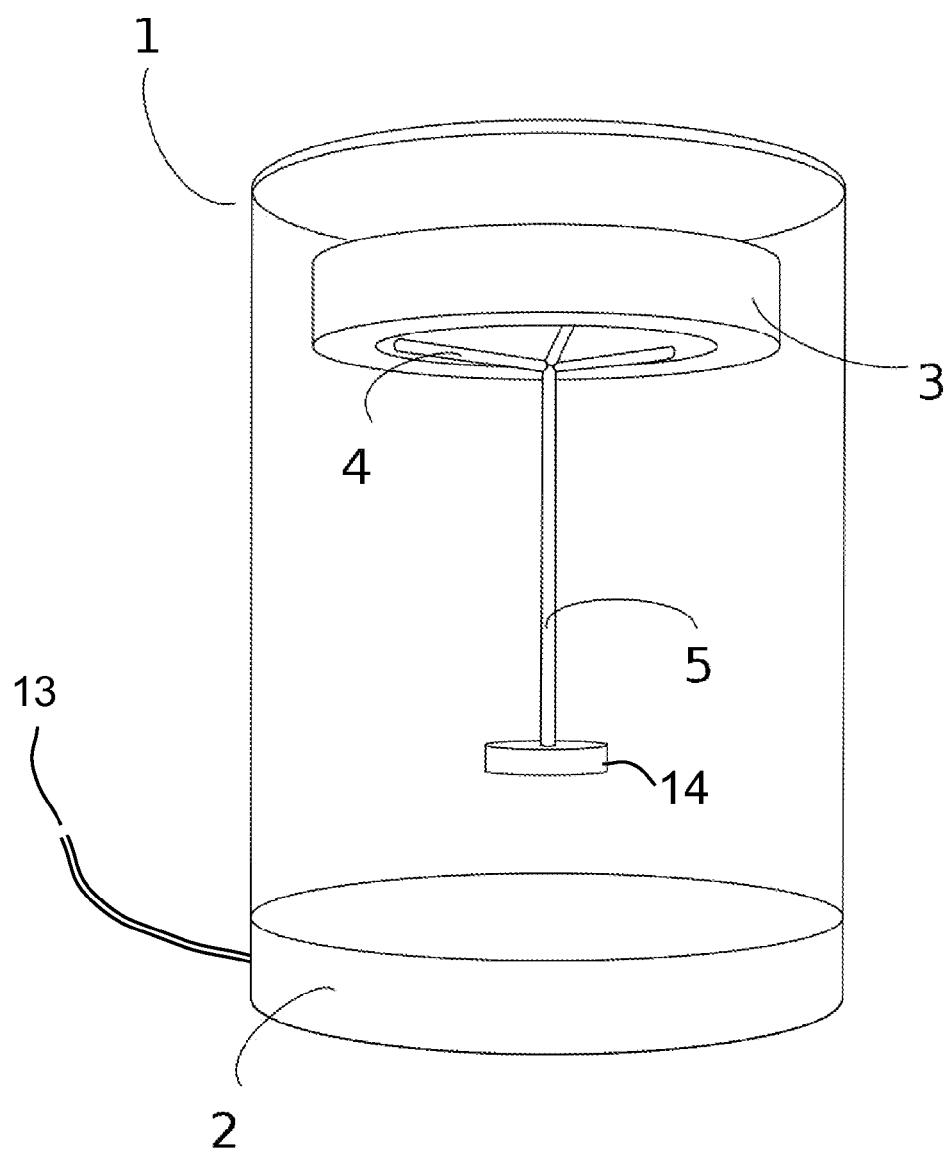
FIG. 1 is a detailed perspective drawing of the elevated device.

The present invention consists of a mode of elevating and manipulating objects using fields only that a) is equipped with at least on electromagnet field producing source or device positioned as to exert or potentially vertically exert the produced field onto or about an object, boundary, or surface of an object such that the object(s) is elevated (as in two flat-faced magnets of the same polarity facing each other, one above the other, for example) and manipulated by the field producing source, b) is made, drawn, or designed such that the strength or degree of the field from the field producing source(s) or devices may be manipulated by the field source(s) or device(s) the elevated and manipulated object(s) and c) is equipped such that the field producing source(s) elevate and manipulate the object(s) operate in a desired manner.

The elevation of the object in the present invention is sustained by continuing the repelling power of the repelling elevating electromagnet over a period of time when the object has reached a desired height. The object may be elevated within a glass tube 1 or rectangular enclosure and the height of the object may be maintained by the repelling elevating electromagnet. The calculations of the required electromagnet forces, work, and power can be determined by equations well known in the art.

The inner walls of the glass tube and the inner diameter of the glass tube, in conjunction and similarity to the diameter of the elevated magnetic object keep the elevated magnetic object directly and vertically over the surface of the bottom electromagnet and hence direct repelling electromagnetic field force and pressure. The inner walls of the glass tube in conjunction with the width of the outer edges of the elevated magnetic object and the closeness of the outer edges of the elevated magnetic object to the inner walls of the glass tube, restrict the flipping of the elevated magnetic object while elevated and manipulated. The elevation and manipulation of the magnetic object may also be demonstrated if the elevated and manipulated magnetic object is smaller than the inner glass tube walls (two inches for example) and the magnetic object has an additional mass 14 connected to it, hanging downward from the magnetic object by a stabilizing apparatus 5 to contribute to the stability and flipping reduction of the magnetic object during elevation; appropriate positioning of the center of mass 14. The additional mass 14 may have a diameter less than the diameter of the inner magnetic object (half the diameter of the magnetic object, for example). Again, the elevated and manipulated magnetic object is not permanently or temporarily connected to the glass tube or bottom electromagnet and hence is elevated and manipulated.

In one embodiment, the chamber is rectangular in shape. The four sides are between 12 inches and 72 inches in height and between 0.125 inches and 1 inches in thickness, and the lengthwise sides are between 8 inches and 60 inches in length, and the lateral sides are between 0.5 inches and 12 inches in width. The inside width of the glass enclosure 6 is 4 inches. Component 5 must therefore be greater than 4 inches and will initially be 5 inches in length. Note that there is a maximum length of component 5 for which a) flipping of the elevated magnet 3 is minimized, b) the stability of the elevated magnet 3 is maximized, and c) the distance between the electromagnet 7 and the bottom of component 5 can be maximized.

In another embodiment, the chamber is cylindrical in shape. Component 1 is a round or cylindrical glass see-through (plexiglass, plastic, or other material) enclosure (with or without a top cover) similar to a test tube with or without the bottom of the tube present. An electromagnet 2 or other magnet is positioned within the bottom of the enclosure such that the direction of the repelling electromagnet 2 or other magnet field towards the elevated magnet 3 is upwards or vertical and the field is within the enclosure. The glass enclosure 1 may be closed or capped at the top and should be of a length comparable to a) the repulsive strength of the electromagnet and hence b) the repulsive force between the electromagnet 2 and the elevated magnet 3. The power of the electromagnet 2 and the repulsion between the electromagnet 2 and the magnet 3 should be such that the magnet 3 may be elevated approximately 2 feet above the surface of the electromagnet. The electromagnet 2 may be connected to an energy source 13 if required or the magnet field may be self generating. The electromagnet field may be controlled electronically, physically, or by other means.

Component 4 is a light-weight, triangular shaped (or other shaped) positioning component firmly connected to the elevated magnet 3 that holds component 5 in the center of the elevated magnet 3 in a strong, sturdy manner. Component 4 may be less than or equal in thickness to the elevated magnet 3. The size, shape, and mass of component 4 should allow maximum repulsive elevation and manipulation of the elevated magnet 3.

Component 5 is a light-weight, sturdy or rigid material, extending downward from the center of the triangular shaped component. Component 5 is inert to the glass enclosure and has a round bottom mass 14. Component 5 may vary in shape, size, weight, and magnetic inertness. The round bottom mass 14 should also be light-weight and may be made of plastic, wood, cloth, rubbery or other material with minimum friction with the glass enclosure. The 'round bottom mass 14' may be spherical or circular in nature. The circular round bottom mass 14 may be attached directly or indirectly to the bottom of component 5. The diameter of the circular round bottom mass 14 may be up to just short of the inside diameter of the glass enclosure and should be made to optimize the elevation and manipulation of the elevated magnet 3. The total length of component of 5 must be greater than the inside diameter (d) of the glass enclosure to the extent that as the magnet 3 'attempts' to flip, the bottom of component 5 will touch the inside walls of the glass enclosure and prevent the magnet 3 from flipping. The greater the length of component 5 compared to the inside diameter (d) of the glass enclosure, the less will the magnet 3 flip when being repelled by the electromagnet. Regarding the efficiency of the process of elevating and manipulating the elevated magnet 3, the center of gravity of the three components of the entire elevated object including the magnet 3 component 5, and the triangular shaped positioning component 4, and the mass of the entire elevated object should be a) positioned for maximum flipping resistance and b) relatively small compared to the mass of the magnet 3, respectively. "Light-weight" is relative to the size and weight of the magnet 3 and to the repulsive force between the electromagnet 2 connected to a variable power source 13 and the magnet 3.

Figure 2:
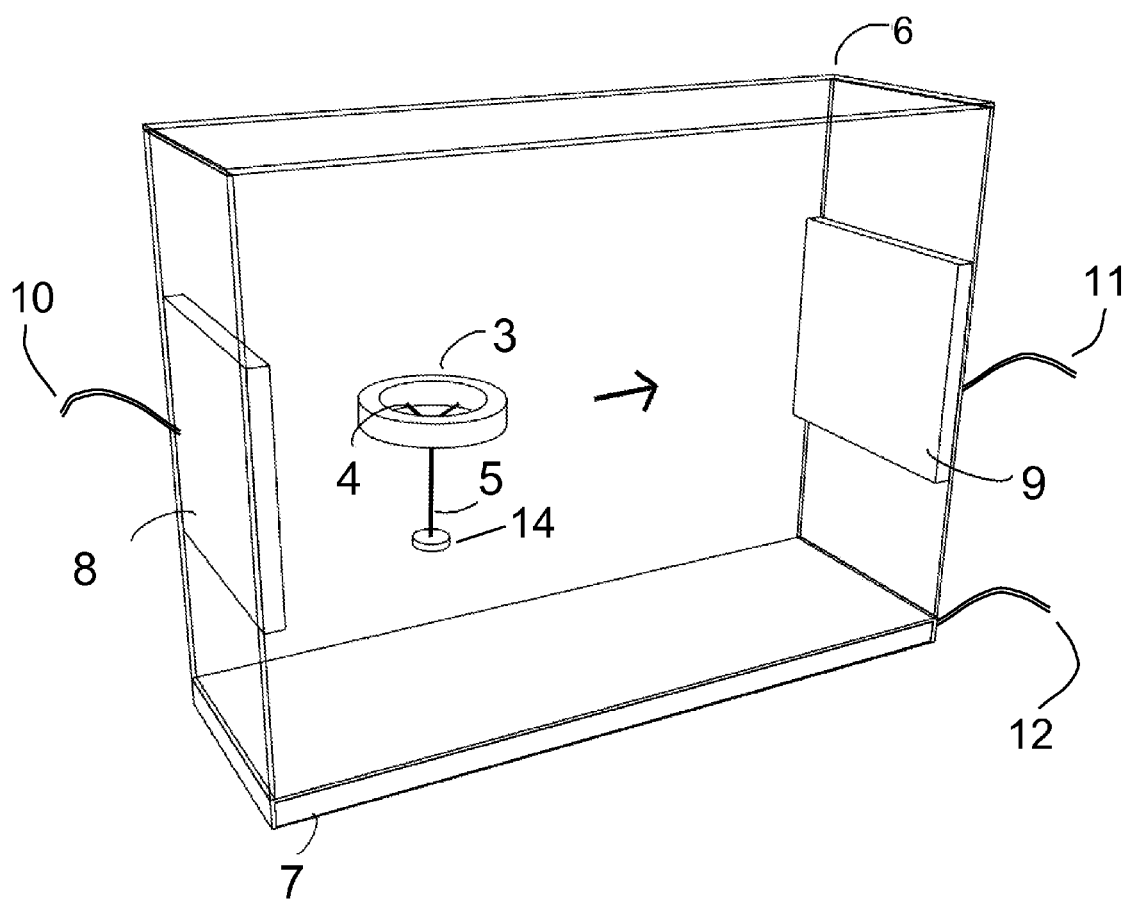
FIG. 2 is a perspective drawing of the chamber for magnetic repulsion.

During manipulation of the rectangular embodiment, Electromagnet 3 is elevated, via a power source 12 to electromagnet 7 and sustained in a first position by the power and the second repelling electromagnet 8, via connection to a variable power source 10, may repel the elevated electromagnet 3 from the first position to (FIG. 2; arrow) a second position. Also, the third repelling electromagnet 9, via a connection to a variable power source 11, may repel elevated electromagnet 3 from the second position to the first position.

The invention claimed is:

1. I claim an elevated flat-faced electromagnet flip-resistant walled above-positioned elevated flat-faced electromagnet-centering elevated flat-faced electromagnet manipulating upward vertically repelling-only flat-faced base electromagnet supporting glass or PLEXIGLASS (Acrylic glass) unrestricted vertically elevating liquid-free helium-free chamber for a dimension-specific elevated device comprising: a flat-faced electromagnet flip-resistant wall-connected flat-faced base magnet-supporting glass or PLEXIGLASS (Acrylic glass)-connected upward, vertically-elevating-only system-supporting and directly beneath the elevated object-located only base, and four elevated-object-flip-resistant transparent glass or PLEXIGLASS (Acrylic glass) sides wherein said four sides consist of two parallel vertical lengthwise sides between 12 inches and 72 inches in height, and said four sides are between 0.125 inches and 1 inches in thickness, and said lengthwise sides are between 8 inches and 60 inches in length, and two parallel vertical lateral sides between 0.5 inches and 12 inches in width, said base is attached to a horizontally oriented flat-faced single vertical axis directionally upward and vertically repelling-only ninety-degree angle relative to elevated object surface-positioned only and directly beneath the elevated object-located only base magnet and said lateral sides are each attached to a vertically oriented lateral magnet.

2. The chamber of claim 1 wherein said horizontally oriented base magnet and said vertically oriented lateral magnet are connected to an adjustable power supply.

3. The chamber of claim 1 wherein said horizontally oriented base magnet is an electromagnet attached to a base-specific power supply and said vertically oriented lateral magnets are electromagnets which are each attached to one lateral side-specific power supply.

4. The chamber of claim 2 wherein said four sides are of equal height.

5. The chamber of claim 4 additionally comprising a removable top of equal dimensions to said base.

\* \* \* \* \*